Figure 1:
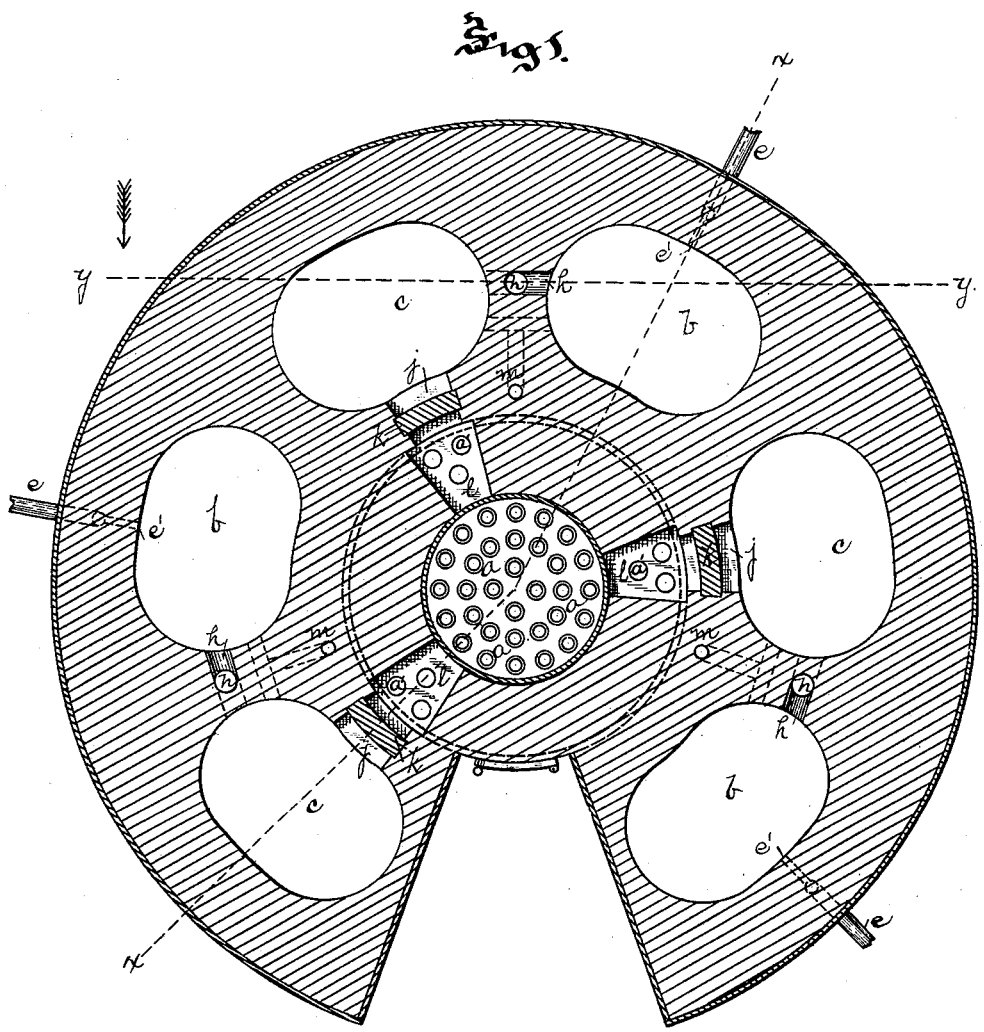

(No Model.) 2 Sheets—Sheet 1.

J. M. ROSE.
PROCESS OF MANUFACTURING WATER GAS.

No. 391,386. Patented Oct. 16, 1888.

Witnesses:
J. T. Cooke.
N. S. Stockwell.

Inventor.
James M. Rose.
By James J. Kay.
Attorney.

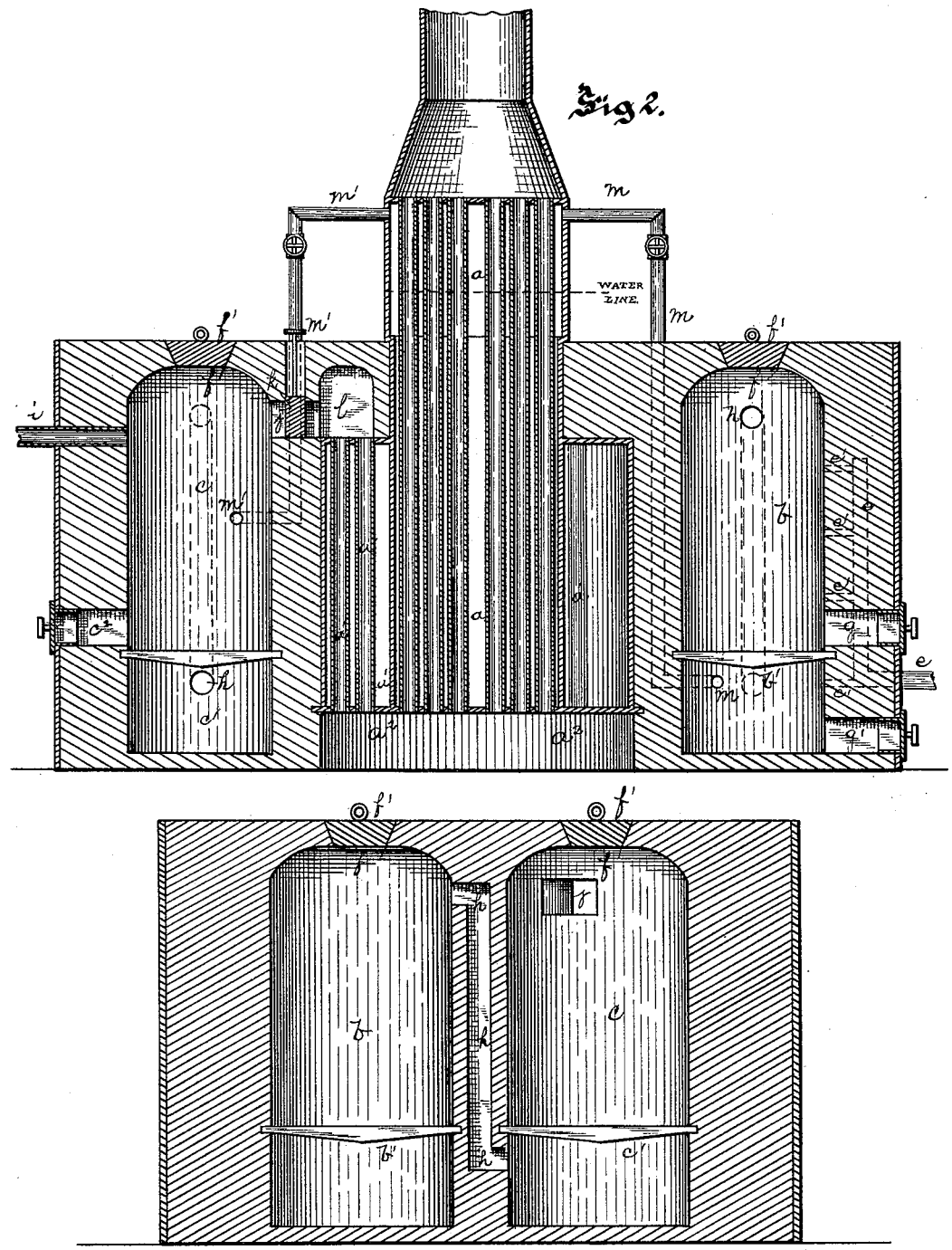

UNITED STATES PATENT OFFICE.

JAMES M. ROSE, OF ALLEGHENY, PENNSYLVANIA, ASSIGNOR TO THE ROSE GAS GENERATOR COMPANY, OF NEW JERSEY.

PROCESS OF MANUFACTURING WATER-GAS.

SPECIFICATION forming part of Letters Patent No. 391,386, dated October 16, 1888.

Application filed March 2, 1887. Serial No. 229,435. (No model.)

*To all whom it may concern:*

Be it known that I, JAMES M. ROSE, of Allegheny, in the county of Allegheny and State of Pennsylvania, have invented a new and useful Improvement in the Process of Manufacturing Water-Gas; and I do hereby declare the following to be a full, clear, and exact description thereof.

My invention relates to the manufacture of gas, its object being to provide a rapid and economical process for producing a gas which is adapted for illuminating, fuel, and heating purposes.

To these ends my invention consists, generally stated, in raising a mass of carbon to incandescence and heating by means of the waste products therefrom a mass of limestone or other refractory material impregnated with a heavy hydrocarbon, and then passing through said incandescent fuel and the heated impregnated material a current or currents of steam, as will be more fully described in the specification, and set forth in the claims.

To enable others skilled in the art to make and use my invention, I will describe the same, referring to the accompanying drawings, in which—

Figure 1 is a horizontal section of the apparatus. Fig. 2 is a vertical section of the same on the line $x$ $x$, Fig. 1, and Fig. 3 is a vertical section of the same in the line $y$ $y$, Fig. 1.

Like letters refer to like parts in each of the figures of the drawings.

Arranged around a central boiler, $a$, are a number of gas-generator chambers, $b$, between each of which and alternating therewith are limestone or hydrocarbon chambers $c$, which communicate with the gas-generator chambers and with the boiler, in the manner hereinafter set forth. Each gas-generator chamber $b$ is provided with grate-bars $b'$, and in the outer wall with a flue or passage, $e$, having lateral offshoots $e'$, leading into the chamber, through which an air-blast may be forced into the chamber to raise the mass of fuel to incandescence. The roof of the generator-chamber has therein a charging-port, $f$, closed by a block, $f'$, and the lower part of the chamber is provided with a stoking-hole, $g$, and ash-pit door $g'$, and leading from the upper part of the chamber into the limestone-chamber, just below or into the mass of limestone or refractory materials, is a flue, $h$, Fig. 3, through which the products of combustion from the gas-generator chamber pass. Each hydrocarbon-chamber $c$ is provided with grate-bars $c'$, to support the limestone or other material, and in the upper part of the chamber with a gas-flue, $i$, leading to the gas-storage tanks or to the purifying-box, and a flue, $j$, closed by a damper, $k$, leading into the chamber $l$, which communicates by the flues $a'$ to the chamber $a$ at the bottom of the flue boiler $a$, through which the products of combustion pass, after heating the mass of impregnated limestone or other material in the hydrocarbon-chamber, into the boiler and generate steam in the same. For the purpose of withdrawing the material which is charged into the hydrocarbon-chamber the latter is provided with a stoke-hole, $o$, opposite the grate-bars. Steam-pipes $m$ convey steam from the boiler $a$ to the generator-chamber $b$, just below the grate-bars and pipes $m'$, to the hydrocarbon-chambers just above or below the grate-bars and into the upper part of the same.

In carrying out the process of making gas, which forms the subject-matter of this application, a quantity of blocks or pieces of limestone, dolomite, slag, or some porous refractory material, are coated or impregnated with a heavy hydrocarbon—such as asphaltum, coal-tar, &c.—and the material thus produced charged into the limestone or hydrocarbon chamber $b$ through a port in the roof until the chamber is about half filled, thus forming a mass of refractory material impregnated with a heavy hydrocarbon, and the said chamber is then sealed by suitable means to prevent access of air thereto. At the same time the gas-generator chambers are filled with coke, coal, or other suitable carbon, and when the charging is completed the fuel is ignited and the blast turned on in the air-blast flue $e$, which rapidly causes the fuel to become incandescent, and the products of combustion therefrom, passing over through the flue $h$ into and through the mass of impregnated refractory material, heating the same, the hydrocarbon-chamber being closed, so that no air is admitted to support combustion, and thus burn the hydrocarbon with which the limestone or other material is impregnated. These products of combustion, after passing through the mass of material in the hydrocarbon-chamber, pass through the flue $j$ into the chamber $l$, and thence into the boiler $a$ to generate steam. When the fuel in the generator-chamber has reached the proper degree of incandescence, the air-blast is turned off and the damper $k$ lowered to close the flue leading into the boiler from the hydrocarbon-chamber, after which steam is turned on in the pipes $m$ $m'$. The steam from the former, coming in contact with the incandescent carbon, is decomposed and hydrogen and carbonic oxide formed, which gases pass over into the hydrocarbon-chamber $c$ through the mass of material therein, some of the carbonic oxide uniting with the oxygen released by the decomposition of the steam, which enters the hydrocarbon-chamber below the mass of impregnated material, to form carbonic acid, and the hot gases thus formed, passing through the heavy hydrocarbon, causes the latter to form, with the nascent hydrogen, hydrocarbons principally of the ethylene and paraffine series, which mingle with the carbonic oxide, hydrogen, and other gases in the upper part of the hydrocarbon-chamber.

Any carbon-bisulphide which may have been formed in the fuel-generator chamber is broken up by the high temperature of the lime, hydrocarbon and sulphureted hydrogen formed, which may be subsequently removed by passing the gas through a purifying-box.

During the heating of the limestone or hydrocarbon chamber and the impregnated material therein by the products of combustion passing therethrough the heat causes some of the hydrocarbon to be distilled, which, as the upper walls of the limestone-chamber are at a comparatively low temperature, deposit thereon more or less carbon, as do the products of combustion passing through the chamber to a slight extent. To take up this deposited carbon and still further enrich the gas in hydrogen and reduce the bulk of the carbonic acid formed in the lower part of the limestone-chamber to carbonic oxide, a supply of steam is admitted into the upper part of the limestone-chamber, and as the free carbon and the gases in the upper part of the chamber are now at a high heat the steam is decomposed and the oxygen released united with the hot carbon and this carbonic acid to form carbonic oxide, the hydrogen mingling and passing off with the other gases formed in the lime-chamber through the outlet $i$ to the purifying-box or storage-tanks. The flow of steam into the fuel or generator chamber and into the hydrocarbon-chamber is continued as long as the fuel and material in the hydrocarbon-chamber remains heated to a sufficient degree to effect the decomposition of the steam; but as soon as the heat of these substances falls too low the steam is turned off, the damper $k$ raised, and the air-blast turned on in the passage $e$, which soon raises the temperature of the fuel and the material in the hydrocarbon-chamber to the proper temperature to commence the gas-making step again. When the hydrocarbon with which the material in the limestone-chamber is impregnated is exhausted, the limestone is withdrawn from the chamber and a new charge of impregnated material is inserted. As a series of these sets of gas-making chambers are arranged around the boiler, and as they do not act simultaneously, some one set of chambers is always discharging its products of combustion into the boiler, while another set is always discharging a supply of gas into the storage tanks or reservoir, so that the action of the apparatus is continuous.

The gas which is obtained by this process contains more or less hydrogen, and is rich enough in light hydrocarbons, principally marsh-gas, to insure that a long heating-flame will be obtained in burning it, and hence the gas is well adapted for fuel purposes. As the asphaltum or coal-tar forms with the hydrogen a large percentage of light hydrocarbons, a very large volume of gas is made very quickly at a comparatively low cost.

The above apparatus and the exact order in which the steps of the method are described are not absolutely essential to my improved method, as any other form of apparatus may be used, and instead of passing all of the gases resulting from the decomposition of steam in the generator-chamber through the hydrocarbon-chamber a part may pass off into the storage-tanks directly from the generator-chamber. Further, the hydrocarbon-chamber may be heated in other ways than by the products of combustion passing therethrough, and gas may be made in this chamber alone. What is known as "Neufchâtel limestone" or "Jura limestone"—a natural hydrocarbon-impregnated limestone—may be used in the hydrocarbon-chamber in place of the artificially-prepared material heretofore described.

I do not claim in this application the apparatus described herein, as that forms the subject of a divisional application filed November 1, 1887, Serial No. 253,968.

What I claim, and desire to secure by Letters Patent, is—

1. The improvement in the art of making gas, which consists in heating a mass of coke or coal to incandescence and passing the products of combustion therefrom through a mass of limestone or porous refractory material impregnated with a heavy hydrocarbon and then passing a current or currents of steam into the incandescent fuel and the heated limestone, the gases arising from the steam decomposed by the fuel passing through the limestone, and finally admitting a supply of steam between the mass of limestone and the outlet for the gas, substantially as and for the purpose set forth.

2. The improvement in the art of making gas, which consists in heating a mass of coal or coke to incandescence and passing the products of combustion therefrom through a mass of limestone or porous refractory material impregnated with a heavy hydrocarbon and then passing through said incandescent fuel and heated impregnated limestone a current or currents of steam, substantially as and for the purposes set forth.

3. The improvement in the art of making gas, which consists in heating a mass of coke or coal to incandescence and heating by means of the waste products therefrom a mass of limestone or other refractory material impregnated with a heavy hydrocarbon, and then passing through said incandescent fuel and the heated limestone a current or currents of steam, substantially as and for the purpose set forth.

4. The improvement in the art of making water-gas, which consists in heating a mass of limestone or other porous material impregnated with a heavy hydrocarbon while excluded from the air and then passing through the said material a current of water-gas and steam, substantially as and for the purposes set forth.

In testimony whereof I, the said JAMES M. ROSE, have hereunto set my hand.

JAMES M. ROSE.

Witnesses:
 J. N. COOKE,
 N. S. STOCKWELL.